[54] PROCESS FOR PREPARATION OF METALLIC BOTTLES

[75] Inventors: Kazuo Taira, Tokyo; Akihiko Morofuji, Yokohama; Hiroshi Ueno, Yokosuka, all of Japan

[73] Assignee: Toyo Seikan Kaisha, Ltd., Tokyo, Japan

[21] Appl. No.: 418,400

[22] Filed: Sep. 15, 1982

[30] Foreign Application Priority Data

Sep. 30, 1981 [JP] Japan .................. 56-153764

[51] Int. Cl.$^3$ .................. B29C 27/00; B65B 7/28
[52] U.S. Cl. .................. 156/69; 53/489; 156/294; 156/309.6; 156/331.1; 156/332; 220/359; 428/35; 428/458
[58] Field of Search .................. 53/485, 488, 489; 215/232; 220/359; 156/69, 309.6, 330.9, 294, 331.1, 332; 428/35, 458; 29/469.5, DIG. 1

[56] References Cited

U.S. PATENT DOCUMENTS 4,165,011 8/1979 Holk .................. 220/359 X
4,363,853 12/1982 Imamura et al. .................. 428/458 X

*Primary Examiner*—Robert A. Dawson
*Attorney, Agent, or Firm*—Sherman & Shalloway

[57] ABSTRACT

Disclosed is a process for the preparation of metallic bottles which comprises lap-bonding circumferential open end portions of upper and lower members, each consisting of a formed cup of a metal, said process being characterized by using at least one thermoplastic resin adhesive having a water absorption of less than 2%, as measured at a temperature of 23° C. and a relative humidity of 80%, and an elasticity contribution ratio $[R(t)_{t=1}]$ of from $1 \times 10^{-4}$ to $5 \times 10^{-1}$, defined by the following formula:

$$R(t)_{t=1} = J(t)_{rec,t=1}/J(t)_{t=1}$$

wherein $J(t)_{t=1}$ represents a creep compliance at a time constant of 1 second when the adhesive is caused to creep at a temperature higher by 30° C. than the melting point of the adhesive under a shear stress of 50 to 5,000 dyne/cm$^2$, and $J(t)_{rec,t=1}$ represents an equilibrium recovery creep compliance when the adhesive is caused to creep under the same conditions as described above and the adhesive is then let to recover, and containing in the main or side chain groups

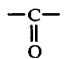

at a concentration of 10 to 1400 milliequivalents per 100 g of the adhesive.

14 Claims, 6 Drawing Figures

PROCESS FOR PREPARATION OF METALLIC BOTTLES

BACKGROUND OF THE INVENTION

1. Field of the Invention

The present invention relates to a process for the preparation of metallic bottles. More particularly, the present invention relates to a process for preparing metallic bottles excellent in the adhesion, sealing property and pressure resistance of the seal and the durabilities of these properties by lap-bonding upper and lower members, each consisting of a formed cup of a metal, on the circumferential end portions thereof through an adhesive.

2. Description of the Prior Art

Bottle-like metallic vessels obtained by lap-bonding upper and lower members, each consisting of a cup-like article formed by drawing or draw-ironing of a metallic material, on the circumferential open end portions thereof to form a circumferential side seam are advantageous in various points over metallic vessels in the form of a can.

Conventional packaging metallic vessels include a so-called three-piece can obtained by double-seaming can lids to the top and bottom of a can body having a side seam to form sealed portions and a so-called two-piece can obtained by double-seaming a can lid to the open end portion of a cup-like can body formed by drawing or draw-ironing of a metallic material to form a sealed portion.

Metallic vessels having this double-seam structure are much limited in the pressure resistance of the sealed portion or the saving of a metallic material. More specifically, in a seam formed by double seaming, if a load is applied to the seam, the material constituting the seam is first deformed, and by this deformation, leakage from the seam or breakdown of the seam is caused under a relatively small load. In the field of packaging vessels, from the economical viewpoint and in order to reduce the weight of a vessel, it always is required to reduce the thickness of a metallic material. However, if the thickness of the body wall of a vessel is reduced, at the double-seaming step or at the step of preparing for the flanging operation, buckling is readily caused under a load applied in the axial direction of the vessel.

A metallic bottle obtained by lap-bonding the open end portions of upper and lower members, each consisting of a formed cup, is advantageous in that even if the thickness of a seam-constituting material is extremely small, deformation of the material is not caused on the seam and the seam can resist a load within the critical shear strength thereof irrespectively of the thickness of the material and that since the double-seaming operation need not be performed, the thickness of the side wall of the vessel can be reduced without any risk of occurrence of buckling.

However, in the case where a circumferential side seam is formed by lap-bonding the open end portions of upper and lower members through an adhesive, various problems should be solved so as to provide a strong bonding on the seam and give a reliable seal to the seam.

More specifically, in the lap bonding using an adhesive, so satisfactory bonding force can be obtained unless a certain pressure is applied to an adhesive layer interposed between portions to be bonded. In the case where a lap seam is straight as in an ordinary can body, compression of the lapped portion can be accomplished relatively easily, but when circumferential open end portions of formed cups are lap-bonded, it is very difficult to apply a pressure to the lapped portion.

As the method for applying a pressing force necessary for bonding to the lapped portion, there have heretofore been considered the following methods.

(1) A method in which the lapped portion is compressed by an external force, such as (a) a method in which upper and lower members are fitted together and the interior is compressed to outwardly expand the end edge to be located on the inner side of the seam or (b) a method in which a clamping force is given to the open end portion to be located on the inner side of the seam to reduce the diameter and the lapped portion is compressed by the elastic recovery force.

(2) A method in which the diameter of the open end portion is changed by thermal expansion to produce a pressing force to the lapped portion, such as a method in which the end edge located on the outer side of the seam is cooled and/or the end edge to be located on the inner side of the seam is heated.

(3) A method in which the difference of the dimension between both the end portions to be formed into the seam is utilized, such as a method in which the outer diameter of the open end portion to be located on the inner side of the seam is made larger than the inner diameter of the open end portion to be located on the outer side of the seam.

The method (1)-(a) is defective in that since the step of cooling and solidifying the adhesive under compression is necessary, the productivity is low and since the formed cup should be pressed in the axial direction so as to prevent divergence of the seam by the inner pressure, buckling deformation of the formed cup is readily caused.

The method (1)-(b) is disadvantageous in that since the open end portion to be located on the inner side of the seam should be pushed into a clamping tool, this open end portion is inconveniently deformed or the adhesive layer or primer applied to this open end portion is cracked or broken.

The method (2) is disadvantageous in that it is technically difficult to uniformly heat the end edge portion located on the inner side and if heating is possible, during the cooling and solidifying step, this inner end edge portion is contracted and a clearance is readily formed between this inner end edge portion and the adhesive layer. When the end edge portion located on the outer side is cooled, also the adhesive is cooled at the solidification temperature or a temperature close thereto, no satisfactory bonding force can be obtained. When the inner end edge portion is heated and the outer end edge portion is cooled, although the heat conductivity of the adhesive is about 1/1000 or less of the heat conductivity of the metal, no satisfactory temperature gradient can be obtained unless the thickness of the adhesive layer is sufficiently large, for example, at least 200 $\mu$m. Moreover, this method is defective in that the surface of the metal is often heated excessively and therefore, the surface of the metal, especially the primer or adhesive layer, is readily deteriorated.

The method (3) is disadvantageous in that fitting of both the open end portions is difficult and if the thickness of the adhesive layer is sufficiently large, for example, 100 $\mu$m or more, permanent deformation of the metallic material is caused in the seam or in the vicinity thereof.

In each of the foregoing methods, elastic deformation of the metallic material is caused in the seam, and a considerable strain is left in the adhesive. In this state, the adhesion failure is readily caused by a denting or impact force, and leakage is apt to take place with the lapse of time. Moreover, it is difficult to produce a uniform pressing force along the entire circumference of the circumferential end edge portion, and the thickness distribution of the adhesive layer or the bonding strength tends to become uneven.

SUMMARY OF THE INVENTION

It is therefore a primary object of the present invention to provide a process for the production of a metallic bottle provided with a circumferential seam formed by lap bonding, in which a metallic bottle excellent in the adhesion, sealing property and pressure resistance of the seam and the durabilities of these properties can be produced without compressing the lapped portion externally or producing an excessively large pressing force to the lapped open end portions.

Another object of the present invention is to provide a process for the production of metallic bottles in which fitting of formed cups can be performed very easily, the heat bonding operation can be accomplished at a high speed in a short time and an excellent metallic bottle as described above can be produced at a high productivity.

More specifically, in accordance with the present invention, there is provided a process for the preparation of metallic bottles which comprises lap-bonding circumferential open end portions of upper and lower members, each consisting of a formed cup of a metal, said process being characterized by using at least one thermoplastic resin adhesive having a water absorption of less than 2%, as measured at a temperature of 23° C. and a relatively humidity of 80%, and an elasticity contribution ratio $[R(t)_{t=1}]$ of from $1 \times 10^{-4}$ to $5 \times 10^{-1}$, defined by the following formula:

$$R(t)_{t=1} = J(t)_{rec, t=1}/J(t)_{t=1} \qquad (I)$$

wherein $J(t)_{t=1}$ represents a creep compliance at a time constant of 1 second when the adhesive is caused to creep at a temperature higher by 30° C. than the melting point of the adhesive under a shear stress of 50 to 5,000 dyne/cm², and $J(t)_{rec, t=1}$ represents an equilibrium recovery creep compliance when the adhesive is caused to creep under the same conditions as described above and the adhesive is then let to recover, and containing in the main of side chain groups

at a concentration of 10 to 1400 milliequivalents per 100 g of the adhesive.

BRIEF DESCRIPTION OF THE DRAWINGS

FIG. 4-B is a graph showing the change of the creep compliance with the lapse of time.

Figure 1:
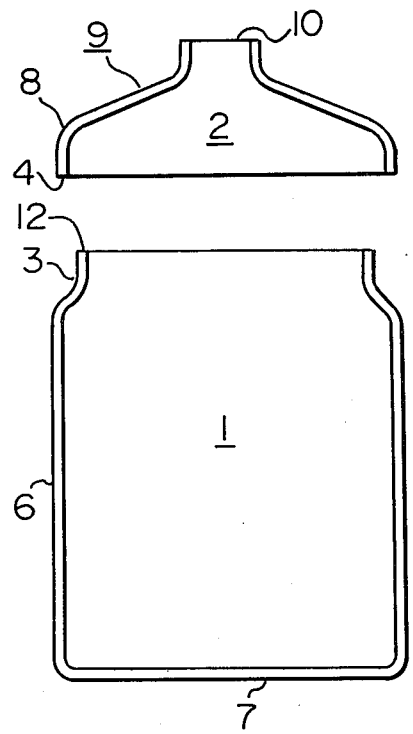
FIG. 1 is a side view illustrating upper and lower members of a metallic bottle, separately.

In the drawings, reference numerals 1, 2, 3, 4, 5, 6, 7, 8, 9, 10, 11 and 13 represent a lower member, an upper member, an open end portion, an open end portion, a side seam, a thin side wall, a bottom, a top wall, a pouring mouth, an adhesive and a covering layer, respectively.

DETAILED DESCRIPTION OF THE PREFERRED EMBODIMENT

The present invention will now be described in detail.

Figure 2:
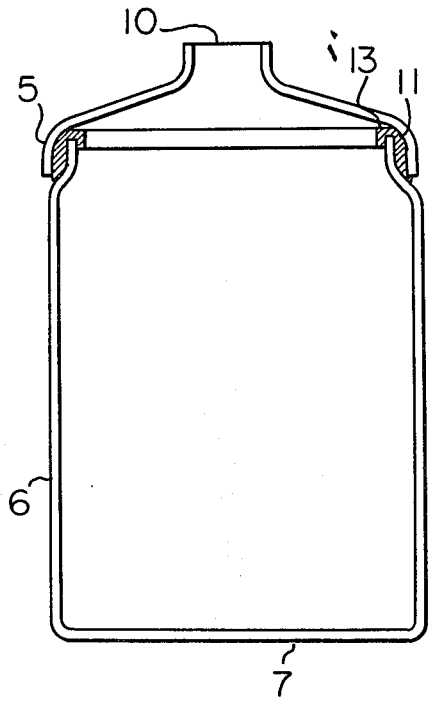
FIG. 2 is a sectional view illustrating a metallic bottle formed by lap-bonding upper and lower members.

Referring to FIGS. 1 and 2 illustrating one embodiment of the metallic bottle according to the present invention, this bottle comprises a lower member 1 consisting of a seamless formed cup of a metal such as a tin-deposited steel plate and an upper member 2 consisting of a seamless formed cup of a metal, and open end portions 3 and 4 of these formed cups are lap-bonded to form a circumferential side seam 5, whereby both the cups are integrated in a vessel.

In this embodiment, the lower member 1 is a cup comprising a tall thin side wall 6 formed by high-degree draw-ironing of a metallic material and a thick bottom 7 which has not substantially been ironed, and the upper member 2 is a cup comprising a short side wall 8 and top wall 9 formed by shallow drawing of a metallic material. The height of the side wall 8 of the lower member 2 is equal to or slightly larger than the width of the seam 5. The top wall 9 of the upper member 2 has an upwardly protruded tapered surface, and a pouring mouth 10 for packing or withdrawing the content is formed at the center of the top wall 9. It will readily be understood that the upper member 2 is bonded in the form of a so-called shoulder and neck to the lower member 1.

In the embodiment illustrated in FIG. 1, the diameter of the open end portion 3 of the lower member 1 is reduced below the diameter of the other barrel wall portion by necking of the portion adjoining to the open end portion 3, and this diameter-reduced open end portion 3 is fitted and inserted into the larger-diameter open end portion 4 of the upper member 2. An adhesive layer 11 is interposed between the outer surface of the open end portion 3 of the lower member 1 and the inner surface of the open end portion 4 of the upper member 2, and the lower and upper members are bonded together by this adhesive layer 11. From the viewpoint of the corrosion resistance, it is preferred that a part of the adhesive 11 be protruded from the seam 5 to form a covering layer 13 for a cut edge 12 of the metallic material located on the inner side of the seam 5.

The characteristic feature of the present invention is based on the finding that when a high-molecular-weight thermoplastic resin having the specific water absorption, elasticity contribution ratio and group

concentration described in detail hereinafter is used as an adhesive for lap bonding for formation of a circumferential side seam, there can be formed a seam excellent in the adhesion, sealing property and pressure resistance and the durabilities of these properties without applying a pressure to the lapped open end portions 3 and 4 of the formed cups from the outside or without performing any particular operation producing a large pressing force between the open end portions 3 and 4.

More specifically, according to the present invention, faultless complete bonding can be attained by a minimum necessary pressing force produced when both the formed cups 1 and 2 are fitted with the adhesive 11 being interposed therebetween, and furthermore, the pressing force produced at the time of fitting is finally moderated at the bonding step and generation of an internal strain in the adhesive layer is prevented.

In fact, according to the present invention, a seam can be formed with strong bonding even if there is established a dimensional relationship satisfying the following requiremnts:

$$D_O \geq D_I \tag{II}$$

and $$D_I + 2d_A > D_O \tag{III}$$

wherein $D_I$ stands for the outer diameter of the open end portion located on the inner side of the seam (often referred to as "inner end portion" hereinafter), $D_O$ stands for the inner diameter of the open end portion located on the outer side of the seam (often referred to as "outer end portion" hereinafter) and $d_A$ stands for the thickness of the adhesive layer interposed between both the open end portions.

In the present invention, it is indispensable that the adhesive to be used should be composed of a high-molecular-weight thermoplastic resin, especially a crystalline, heat-fusion-bondable thermoplastic resin. In a metallic bottle having a circumferential side seam, to which the present invention is directed, substantially all of the load supplied to the vessel at the heat-sterilization or transportion or during the storage acts as a shearing force to the adhesive. An adhesive composed of a high-molecular-weight thermoplastic resin is excellent in the mechanical strength characteristics such as tensile strength and flexural strength over adhesives composed of other resins, and this adhesive can resist the shearing force applied to the adhesive layer and degradation of the adhesion or air tightness can be prevented even under severe conditions. Furthermore, since this thermoplastic resin has high toughness and flexibility, even if a strain is formed in the adhesive layer by a stress and the seam is deformed, fracture of the seam or leakage from the seam can be prevented. Moreover, this thermoplastic resin is advantageous over an adhesive composed of a thermosetting resin such as an epoxy resin or urethane resin in that since the curing step need not be performed, the bonding operation can be completed within a very short time. Still further, when a crystalline thermoplastic resin is used, the above-mentioned mechanical properties are further improved and the bonding strength of the seam is remarkably enhanced.

In order for this thermoplastic resin to sufficiently wet the surface of a metallic material constituting the seam or a primer coated thereon even under a relatively low pressure and provide a strong and durable bonding to this surface, it is indispensable that the thermoplastic resin should contain in the main or side chain thereof polar groups at a certain concentration. In the present invention, therefore, a thermoplastic resin containing in the main or side chain groups

(hereinafter referred to as "carbonyl groups") at a concentration of 10 to 1400 milliequivalents (meq), preferably 12 to 1200 meq, per 100 g of the resin is used. These carbonyl groups are derived from carboxylic acids, carboxylic acid salts, carboxylic anhydrides, carboxylic acid esters, carboxylic acid amides, ketones, carbonic acid esters, urea, urethane or the like. This thermoplastic polymer can be obtained by introducing a monomer having the above-mentioned functional group into the main chain of a polymer by homopolymerization or copolymerization or by bonding this monomer to a thermoplastic resin by graft polymerization or terminal treatment. Moreover, a thermoplastic resin containing carbonyl groups at the above-mentioned concentration can be obtained by oxidizing a hydrocarbon polymer such as an olefin resin.

When the carbonyl group concentration is too low and below the above-mentioned range, the adhesion or bonding force to the material constituting the seam is insufficient under a relatively low pressure, and when the carbonyl group concentration is too high and above the above range, the adhesive layer becomes sensitive to moisture or water and the water resistance or hot water resistance of the seam is reduced, and the cohesive force of the adhesive layer becomes too high and the heat-bonding operation becomes difficult or the toughness is lost. In the present invention, by controlling the carbonyl group concentration in the polymer within the above-mentioned range, the bonding force is prominently improved even under a relatively low pressure, and the operation of applying the adhesive in the form of a film or the like to the portion to be bonded or the heat-bonding operation can be facilitated.

In the present invention, it is indispensable that the thermoplastic resin to be used should have a water absorption of less than 2%, especially less than 1.5%, as measured at a temperature of 23° C. and a relative humidity of 80%. When the adhesive resin is heated and melted in a relatively short time, if the water absorption exceeds a certain level, bubbling is caused to occur. If bubbling takes place in the adhesive layer, the bonding force is reduced and leakage from the seam or reduction of the pressure resistance of the seam results. The degree of bubbling has a relation to the pressure applied at the heat-bonding step, and in the above-mentioned methods (1) through (3) in which a large pressing force is applied, this problem of bubbling is not serious. However, when bonding is carried out under a relatively small compression as in the present invention, the problem of bubbling cannot be neglected. In the present invention, by controlling the water absorption to less than 2%, occurrence of bubbling can effectively be moderated.

In order to provide a strong bonding under a relatively low pressure, fill the adhesive in the portion to be bonded and prevent the strain from remaining in the adhesive layer, it is indispensable that the thermoplastic resin to be used in the present invention should have an elasticity contribution ratio, defined as the above-mentioned formula (I), of from $1 \times 10^{-4}$ to $5 \times 10^{-1}$, especially from $2 \times 10^{-4}$ to $3 \times 10^{-1}$, when it is melted.

The elasticity contribution ratio defined in the instant specification has the following significance.

When a melt of a polymer is deformed by applying a certain external force thereto for a certain time, since the polymer melt is visco-elastic, the deformation of the polymer melt is roughly divided into deformation attributed to the viscosity and deformation attributed to the elasticity. When the stress is removed, the former deformation is left as a permanent strain while the latter deformation is removed with the lapse of time. Accordingly, both the deformations can be distinguished quantitatively from each other by measuring the creep recovery.

The shear deformation of a melt of a polymer is now considered. The creep compliance J(t) is expressed as the sum of the deformation $J\eta$ attributed to the viscosity and the deformation Je attributed to the elasticity. The ratio of Je to the total deformation is regarded as the contribution ratio of the elasticity. When the quantity of the deformation is relatively small, each of Je and $J\eta$ is a function of the time, and for example, in case of the deformation attributed to the viscosity, the deformation quantity is in inverse proportion to the viscosity of the melt and is in direct proportion to the time. The majority of the deformation attributed to the elasticity is changed in direct proportion of the function which monotonously increases from 0 to 1 with the time relative to the retardation spectrum function of the polymer melt.

The proportions of Je and $J\eta$ in J(t) and the time dependence thereof are considerably changed according to the properties of the polymer melt, for example, the temperature, the molecular weight, the molecular weight distribution and the presence or absence of additives such as a plasticizer and a filler.

In the actual measurement, the value of $J(t)_{rec,t=1}/J(t)_{t=1}$ approximating to Je/J(t) can be calculated by causing an adhesive resin to creep at a temperature higher by 30° C. than the softening point of the resin under a certain shear stress of 50 to 5000 dyne/cm$^2$, determining the creep compliance $J(t)_{t=1}$ at a time constant of 1 second and determining the equilibrium recovery creep compliance $J(t)_{rec,t=1}$ when the adhesive is caused to creep under the same conditions as described above and the adhesive is then let to recover.

In the present invention, by selecting and using an adhesive resin having the elasticity contribution ratio $[R(t)_{t=1}]$ within a certain range, it is made possible to utilize the pressing force produced at the time of fitting effectively for bonding while utilizing appropriate elastic properties of the resin in the molten state and to moderate the strain produced in the adhesive layer. In case of an adhesive resin in which the elasticity contribution ratio is too low and below the above range, the pressing force produced at the time of fitting is moderated in a very short time and the bonding force is reduced to a very low level. When the elasticity contribution ratio is too high and above the above range, flowing of the resin at the time of bonding is inhibited and wetting of the material to be bonded with the adhesive resin becomes insufficient, and it is difficult to completely fill the adhesive resin in an open space in the lapped portion, resulting in insufficient bonding and insufficient sealing.

In the present invention, a resin having an elasticity contribution ratio within a certain range is selected and used and the elastic and viscous properties of the molten resin are skillfully utilized for heat bonding of the seam, whereby it is made possible to form a seam excellent in the adhesion, sealing property and pressure resistance and the durabilities of these properties.

Thermoplastic resin adhesives that are suitably used in the present invention will now be described. However, it must be noted that in these thermoplastic resins, the monomer composition, molecular weight and molecular weight distribution should be selected so that the above-mentioned requirements are satisfied.

Preferred examples of the thermoplastic polymer that can be used in the present invention are as follows, through resins that can be used are not limited to those exemplified below.

[A] Polyesters comprising repeating units represented by the following general formula:

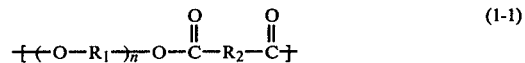 (1-1)

or

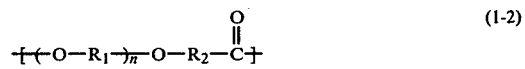 (1-2)

wherein $+O+R_1+_{\overline{n}}$ stands for an oxyalkylene group having 2 to 6 carbon atoms or a polymer thereof, and R$_2$ stands for an alkylene or arylene group having 2 to 24 carbon atoms.

As the dibasic acid component, there can be mentioned terephthalic acid, isophthalic acid, adipic acid, sebacic acid, maleic acid and fumaric acid, and as the glycol component, there can be mentioned ethylene glycol, tetramethylene glycol, propylene glycol, diethylene glycol, triethylene glycol and polymers thereof, that is, polyalkylene glycols. Homopolymers comprising one dibasic acid component and one glycol component and copolyesters comprising a plurality of dibasic acid components and/or a plurality of glycol components are used. For example, there can be mentioned polyethylene adipate, polyethylene sebacate, polyethylene terephthalate, polytetramethylene isophthalate, polyethylene terephthalate/isophthalate, polytetramethylene terephthalate, polyethylene/tetramethylene terephthalate, polyethylene hydroxybenzoate, and copolyesters and blends thereof. In order to modify the properties of the adhesive, some of these polymers may be blended or these polymers may be blended with other resins, for example, polyolefins such as polyethylene, polypropylene, ionomers, ethylene-vinyl acetate copolymers or modified polypropylene.

[B] Homopolymers or copolymers of monomers represented by the following general formula, copolymers of these monomers with olefins or other vinyl monomers, or acrylic-modified polyolefins:

 (2)

wherein R$_3$ stands for a hydrogen atom or a lower alkyl group, and R$_4$ stands for a hydrogen atom or an alkyl group having 1 to 12 carbon atoms.

For example, there can be mentioned polyacrylic acid esters, polymethacrylic acid esters, ethylene/acrylic acid ester copolymers, acrylic acid ester/acrylic acid copolymers, ethylene/acrylic acid ester/acrylic acid copolymers, ethylene/acrylic acid copolymers, styrene/methacrylic acid ester/acrylic acid copolymers, acrylic acid-grafted polyethylene, acrylic acid-grafted polypropylene, acrylic acid ester/vinyl chloride copolymers, acrylic acid ester-grafted polyethylene, methacrylic acid ester/vinyl chloride copolymers, styrene/methacrylic acid ester/butadiene copolymers and methacrylic acid ester/acrylonitrile copolymers.

[C] Copolymers of vinyl esters represented by the following general formula:

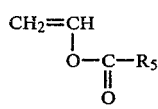  (3)

wherein $R_5$ stands for a hydrogen atom or an alkyl or phenyl group, with olefins or other vinyl monomers, and partial saponification products thereof.

For example, there can be mentioned partially saponified ethylene/vinyl acetate copolymers, ethylene/vinyl propionate copolymers, ethylene/vinyl acetate copolymers, acrylic acid ester/vinyl acetate copolymers and vinyl chloride/vinyl acetate copolymers.

[D] Ionomers, that is, resins obtained by neutralizing copolymers of olefins with unsaturated carboxylic acids, optionally further with other vinyl monomers, by an alkali metal, an alkaline earth metal or an organic base.

For example, there can be mentioned Surlyns supplied by Du Pont Co., U.S.A.

[E] Copolymers of maleic anhydride with other vinyl monomers and maleic anhydride-modified polyolefins.

For example, there can be mentioned maleic anhydride/styrene copolymers, maleic anhydride-modified polypropylene and maleic anhydride-modified polyethylene.

[F] Polycarbonates having repeating units represented by the following general formula and copolycarbonates with aliphatic dihydroxyl compounds or aromatic dihydroxyl compounds:

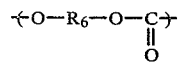  (4)

wherein $R_6$ stands for a hydrocarbon group having 8 to 15 carbon atoms.

For example, there can be mentioned poly-p-xylene glycol biscarbonate, polydihydroxydiphenylmethane carbonate, polydihydroxydiphenylethane carbonate, polydihydroxydiphenyl-2,2-propane carbonate and polydihydroxydiphenyl-1,1-ethane carbonate.

[G] Polyamides and copolyamides comprising the following repeating units:

  (5)

or

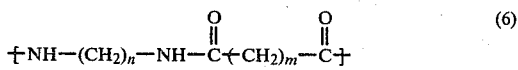  (6)

wherein n is a number of from 3 to 13 and m is a number of from 4 to 11.

For example, there can be mentioned poly-ω-aminocaproic acid, poly-ω-heptanoic acid, poly-ω-aminocaprylic acid, poly-ω-aminopelagonic acid, poly-ω-aminodecanoic acid, poly-ω-aminoundecanoic acid, poly-ω-aminododecanoic acid, poly-ω-aminotridecanoic acid, polyhexamethylene adipamide, polyhexamethylene sebacamide, polyhexamethylene dodecamide, polyhexamethylene tridecamide, polydecamethylene adipamide, polydecamethylene sebacamide, polydecamethylene dodecamide, polydecamethylene tridecamide, polydodecamethylene adipamide, polydodecamethylene sebacamide, polydodecamethylene dodecamide, polydodecamethylene tridecamide, polytridecamethylene adipamide, polytridecamethylene sebacamide, polytridecamethylene dodecamide, polytridecamethylene tridecamide, polyhexamethylene azelamide, polydecamethylene azelamide, polydodecamethylene azelamide and polytridecamethylene azelamide.

In order to improve the toughness, handling property and slip characteristic of the adhesive, a copolyamide comprising components as indicated above may be blended with other resin such as a polyolefin.

[H] Polyureas having repeating units represented by the following general formula:

  (7)

or

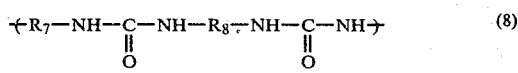  (8)

wherein $R_7$ and $R_8$ stand for an alkylene group having 1 to 13 carbon atoms.

For example, there can be mentioned polyhexamethylene-urea, polyheptamethylene-urea, polyundecamethylene-urea and polynonamethylene-urea.

[I] Polyurethanes and polyureaurethanes having the following recurring units:

  (9)

or

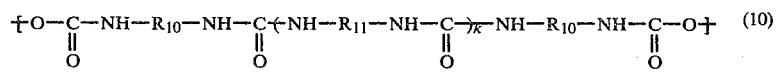  (10)

wherein $R_9$ stands for an alkylene group, polyether residue or polyester residue having 3 to 24 carbon atoms, $R_{10}$ stands for an alkylene or arylene group having 3 to 24 carbon atoms, $R_{11}$ stands for an alkylene or arylene group having 1 to 13 carbon atoms, and k is a number of 0 or 1.

For example, there can be mentioned polytetramethylene-hexamethylene-urethane, polyhexamethylene-tetramethylene-urethane, and polyureaurethanes formed by chain-extending isocyanate-terminated polyesters or isocyanate-terminated polyethers with diamines or water.

[J] Resins obtained by oxidizing polyethylene, polypropylene or a crystalline ethylene/propylene copolymer with oxygen, ozone or other oxidant.

Resins especially suitable for attaining the objects of the present invention are polyesters, especially copolyesters, polyamides, ionomers, acid-modified polyolefins and polycarbonates, as recited in order of importance. Preferred copolyesters are copolyesters comprising terephthalic acid units and other dibasic acid units as the dibasic acid component and tetramethylene glycol units as the diol component and copolyesters comprising benzene-dicarboxylic acid units as the dibasic acid component and tetramethylene glycol units and other diol units as the diol component.

At least one nylon containing 4 to 12 amide groups per 100 carbon atoms is preferred as the polyamide.

The thermoplastic resin to be used in the preennt invention should have a sufficiently high molecular weight, and it is preferred that the number average molecular weight of the thermoplastic resin be at least 6,000, especially 9,000 to 500,000. In view of the heat-fusion-bondability and in order to facilitate the heat-bonding operation, it is preferred that the softening point (melting point) of the thermoplastic resin be 80° to 280° C., especially 90° to 240° C.

Known additives such as ultraviolet absorbers, stabilizers, lubricants, antioxidants, fillers, pigments, dyes and antistatic agents may be incorporated into the thermoplastic resin according to known recipes, if desired.

As the metallic material to be formed into a seamless cup, there can be used untreated steel plates (black plates), various surface-treated steel plates, for example, deposited steel plates such as tin-deposited steel plates (tinplates), zinc-deposited steel plates, aluminum-deposited steel plates, nickel-deposited steel plates and chromium-deposited steel plates and chemically treated steel plates such as steel plates treated with phosphoric acid and/or chromic acid, plates of light metals suchas aluminum, and composite plate materials thereof.

For the production of a seamless cup, a metallic material such as mentioned above is punched in the form of a disc or the like, the disc is subjected to a one-staged or multi-stage drawing operation between a drawing punch and a drawing die, and the drawn cup is then subjected, if desired, to a multi-staged ironing operation between an ironing punch and an ironing die. The drawing and ironing conditions are known, and the drawing and ironing operations may be carried out under these known conditions.

The thickness of the metallic material to be processed is changed according to the size of the final bottle and the kind of the metallic material, but it is ordinarily preferred that the thickness of the metallic material be 0.2 to 0.5 mm, especially 0.2 to 0.35 mm. When the ironing operation is carried out, it is preferred that the ironing operation be conducted to such an extent that the thickness of the side wall portion is 0.05 to 0.20 mm, especially 0.06 to 0.17 mm.

The metallic material is coated with an anticorrosive protecting paint before formation into a cup, or a formed cup is trimmed and, if desired, subjected to a washing treatment and a chemical surface treatment with phosphoric acid and/or chromic acid and at least the inner surface of the formed cup is coated with an anticorrosive protecting paint. As the protecting paint, there can be used optional paints composed of thermosetting and thermoplastic resins, for example, modified epoxy paints such as phenol-epoxy paints and amino-epoxy paints, vinyl and modified vinyl paints such as vinyl chloride/vinyl acetate copolymer paints, partially saponified vinyl chloride/vinyl acetate copolymer paints, vinyl chloride/vinyl acetate/maleic anhydride copolymer paints, epoxy-modified vinyl resin paints, epoxyamino-modified vinyl resin paints and epoxy-phenol-modified vinyl resin paints, acrylic resin paints, and synthetic rubber paints such as styrene/butadiene copolymer paints.

The protecting paint is applied in the form of an organic solvent solution such as an enamel or lacquer or an aqueous dispersion or solution to the formed cup according to spray coating, dip coating, electrostatic coating or electrophoretic coating. Of course, when a thermosetting resin type paint is used, the coated paint is baked according to need.

In the present invention, the adhesive is applied to the open end portions of the cups to be bonded before fitting of the cups. It is preferred that the adhesive be applied so that the thickness of the adhesive resin layer is 10 to 200 $\mu$m, especially 20 to 150 $\mu$m, and that the width of the lap-bonded portion, that is, the lap width, is 1 to 30 mm, especially 2 to 20 mm.

The adhesive resin may be applied in various forms, for example, a film, a powder, a slurry, a solution, a plastisol and an emulsion, to a desirable part of the cup. In order to facilitate handling, coating and drying of the adhesive resin, it is preferred that the adhesive resin be applied in the form of a film.

For application of the adhesive, there may be adopted various coating methods such as lamination, extrusion, electrostatic powder coating, electrostatic deposition coating, spray coating, nozzle extrusion, dip coating, roll coating and brush coating, and an appropriate coating method is selected according to the kind and form of the adhesive.

When the above-mentioned protecting paint is applied to the portion, to be bonded, of the metallic material, this paints acts as a primer, and a desirable bondability is obtained. Of course, a paint acting as a primer may be coated on the metallic material prior to application of the adhesive.

In the case where the circumferential open end portions of the cups are lap-bonded, a cut edge of the metallic material is inevitably exposed to the inner side of the seam. This cut edge may be protected before fitting of the cups by wrapping the cut edge with an adhesive tape or applying a powder, slurry or solution of the adhesive to the cut edge.

The adhesive may be applied to the outer or inner face of the open end portion of the cup to be formed into the inner or outer side of the seam, or to both the above-mentioned inner and outer surfaces.

The adhesive-applied cup is fitted with the other cup, and the adhesive present in the lapped portion is melted and, if desired, the formed seam is cooled, whereby the intended seam is obtained. Heating of the lapped portion can be performed by high frequency induction heating, infrared ray heating, hot air heating and conduction heating from a heating member, and cooling of the seam can be accomplished by optional cooling means such as natural cooling, air cooling and water cooling.

In the present invention, melting of the adhesive is carried out so that the dimensional requirements defined by the formulae (II) and (III) are satisfied, that is, in the state where the adhesive layer is appropriately pressed and held between the open end portion to be located on the outer side of the seam and the open end portion to be located on the inner side of the seam, whereby a seam excellent in the air tightness and adhesion is obtained. In the present invention, it is preferred that this operation be carried out so that the thickness of the adhesive after bonding is 10 to 150 μm, especially 10 to 100 μm.

In the present invention, since the dimensions of the respective parts constituting the seam are set so that the requirement of the above-mentioned formula (II) is satisfied, fitting of the formed cups can be performed relatively easily. This is one advantage of the present invention.

When the open end located on the outer side is heated and expanded at the cup-fitting step, fitting of cups is further facilitated.

The bottle of the present invention is especially suitable as a vessel for a content having a spontaneous pressure, such as a carbonated drink, beer or bubbled spirit and also as an inner pressure vessel in which nitrogen gas or liquefied nitrogen is packed together with a content.

The metallic bottle of the present invention is prominently advantageous over conventional plastic bottles (blow-moulded polyethylene terephthalate bottles) and glass bottles. These advantages are summarized in Table A.

TABLE A

| | Metallic Bottle of Present Invention | Plastic Bottle (PET) | Glass Bottle |
|---|---|---|---|
| Light weight (handling property) | ⊙ | ⊙ | X |
| Falling strength | ⊙ | O | X |
| Dimension stability (heat-resistant, pressure-resistant creep property) | ⊙ | X | ⊙ |
| Gas barrier property | ⊙ | Δ | ⊙ |
| Light shielding property | ⊙ | Δ | Δ |
| Manufacturing rate | ⊙ | Δ | Δ |
| Rate of cooling content | ⊙ (prominent with increase of volume) | X | Δ |
| Crushability | O | X | X |

The present invention will now be described in detail with reference to the following Examples.

Various physical properties of thermoplastic adhesives used in the Examples were determined according to methods described below. Since the significances of these physical properties are definite, they can be determined according to methods other than those described hereinafter, and the measurement methods are not limited to those mentioned below.

[Measurements of Physical Properties of Adhesives]

(A) Measurement of Water Absorption:

A film of an adhesive resin having a thickness of 0.1 mm and an area of 25 cm² was used as a test piece. The water absorption ΔC (%) was calculated from the weight Wo of the test piece in the dry state and the weight W of the test piece which had been allowed to stand still at 23° C. for 3 months in a desiccator humidified with a saturated aqueous solution of ammonium sulfate [(NH4)2SO4] according to the following formula:

$$C = \frac{W - W_o}{W_o} \times 100$$

Figure 3:
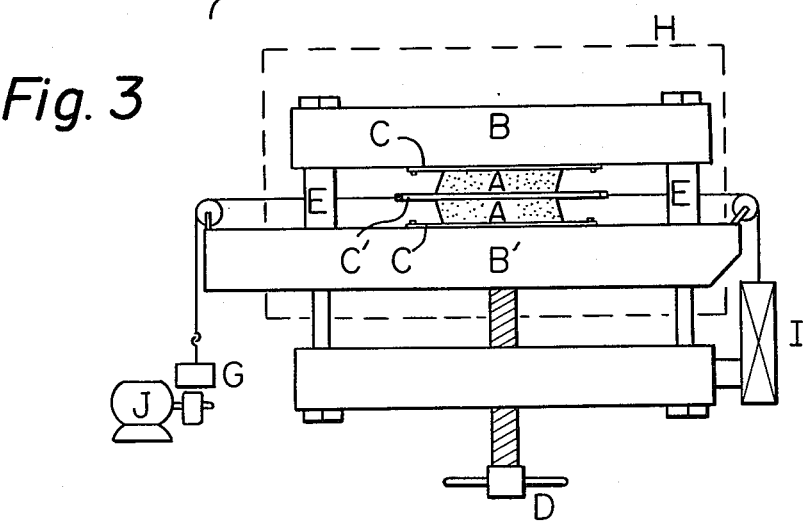
FIG. 3 is a diagram illustrating an apparatus for measuring the shear creep compliance.

(B) Measurement of Elasticity Contribution Ratio:

An apparatus shown in FIG. 3, which was constructed by modifying a simple shear creep measuring apparatus disclosed by K. E. van Holde and J. W. Williams [J. Polym. Sci., 11, 243 (1955)].

Reference numerals in FIG. 3 represent the following members.

A,A': samples
B,B': sample-attaching discs
C,C': electrolytically chromic acid-treated steel plates having thickness of 0.10 mm
D: clearance-adjusting screw
E: spacer
G: weight
H: thermostat chamber (substituted with nitrogen gas)
I: differential transformer
J: load application time-adjusting motor Two samples A and A', each being an adhesive resin film having an area a and a thickness d, were sandwiched between two of three electrolytically chromic acid-treated steel plates C and C', respectively. The upper and lower steel plates C were screwed to discs B and B', and the intermediate steel plate C was connected to a piano wire on one end and to a rod connected to a transformer on the other end through clamps. Most adhesives had a good adhesion to the steel plates C and C' when they were melted, and during the creep test, no slip was caused between the steel plate and the adhesive. However, in some cases, a slip was caused. In such cases, good results were obtained when primer-coated steel plates were used. The spacer E was adjusted so that it corresponded to the total thickness of the steel plates and the films, and the entire test piece was loosely fixed by the screw D.

Then, the portion of the apparatus surrounded by a broken line was maintained at a temperature higher by 30° C. than the softening point of the adhesive and the inside atmosphere was substituted by nitrogen gas. After 30 minutes had passed from the point of arrival at the predetermined temperature, the creep test was started. The load was given by a variable weight G attached to the top end of the piano wire, and the load-applying time was adjusted to 1 second precisely by a motor having an eccentric cam connected thereto. The change Δx(t) of displacement with the lapse of time was measured moment by moment by the differential transformer. An electromagnetic oscilloscope was used in combination for recording displacement in a short time. The dimensional factors of the sample and the applied load were selected within ranges of a=1 to 25 cm, d=0.05 to 1.00 cm and G=0.05 to 20 Kg so that a highest measurement precision could be obtained.

Supposing that the displacement is Δx(t) (cm) and the load is F (dyne), the creep compliance J(t) at the time t is given by the following formula:

$$J(t) = \frac{2a}{dF} \Delta x(t) \qquad (12)$$

Figure 4A:
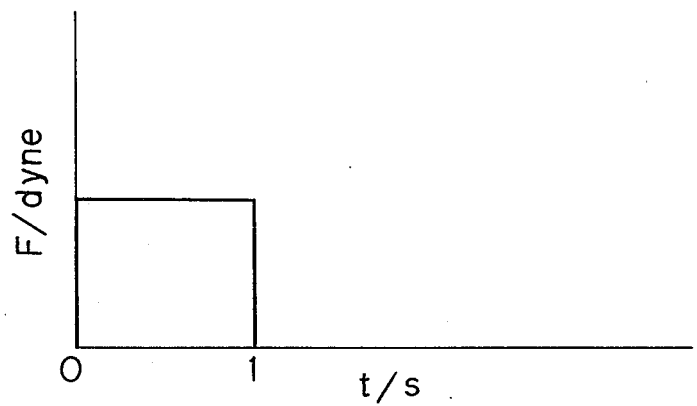
FIG. 4-A is a graph showing the change of the load at the time of measuring the creep compliance.
Figure 4B:
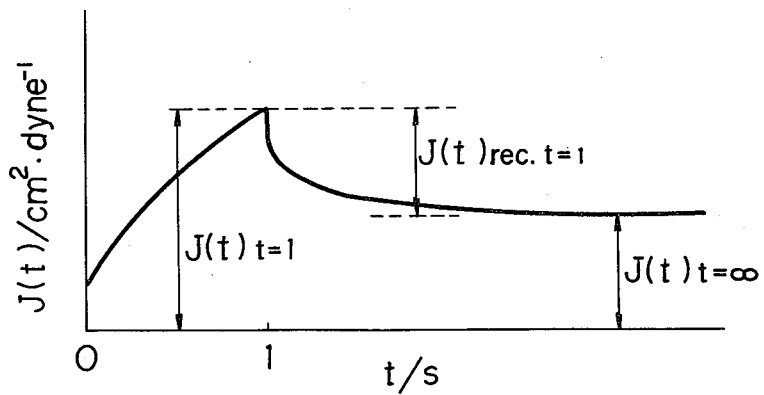

At the test, the load was applied at the time of t=0 and this load was removed at the time of t=1 (see FIG. 4-A). A typical behavior of J(t) observed in this case is shown in FIG. 4-B. The value of $J(t)_{rec, t=1}$ necessary for calculation of the elasticity contribution ratio was determined from the difference between the creep compliance $J(t)_{t=1}$ at the time of t=1 and the steady-state compliance $J(t)_{t=\infty}$. The elasticity contribution ratio $R(t)_{t=1}$ of the adhesive at the above-mentioned temperature was calculated according to the following formula:

$$R(t)_{t=1} = \frac{J(t)_{rec, t=1}}{J(t)_{t=1}} \qquad (13)$$

In the Examples, the metallic bottles were evaluated according to the following methods.

[Methods for Evaluation of Metallic Bottles]

[A] Measurement of Shear Strength of Bonded Portion:

With respect to each of the metallic bottle after the bonding operation and the bottle which had been allowed to stand at 70° C. for 10 hours in the water-filled state, a specimen including a bonded portion having a length of 7 cm in the direction of the height of the bottle and a length of 2 cm in the circumferential direction was sampled, and the specimen was subjected to a shear fracture test at a tensile speed of 100 mm/min at room temperature by using a Tensilon tester. The shear strength was determined while the bonded area of the lap-bonded portion was taken into consideration. With respect to each sample, three bottles were tested and the arithmetical mean value was calculated. Incidentally, in samples having a shear strength of 55 to 57 Kg, shown in Tables given hereinafter, fracture was caused in the plates, and the practical strength was much higher.

[B] Leakage and Body Breakage Percent after Standing at 50° C. for 3 Months:

The bottle in which the upper member was separated from the lower member or the upper or lower member was deformed to form a clearance in the bonded portion was judged as the body breakage bottle, and the bottle in which the inner pressure at 25° C. was lower by more than 5% than the inner pressure at the same temperature just after filling or bleeding of the content was observed in the vicinity of the bonded portion was judged as the leakage bottle. In the tables, the ratio of the sum of the numbers of the barrel breakage bottles and the leakage bottle to the total number (50) of the tested bottles is shown as "leakage percent (%)", and the parenthesized value indicates the body breakage percent (%), that is, the ratio of the number of the body breakage bottles to the total number of the tested bottles.

Figure 5:
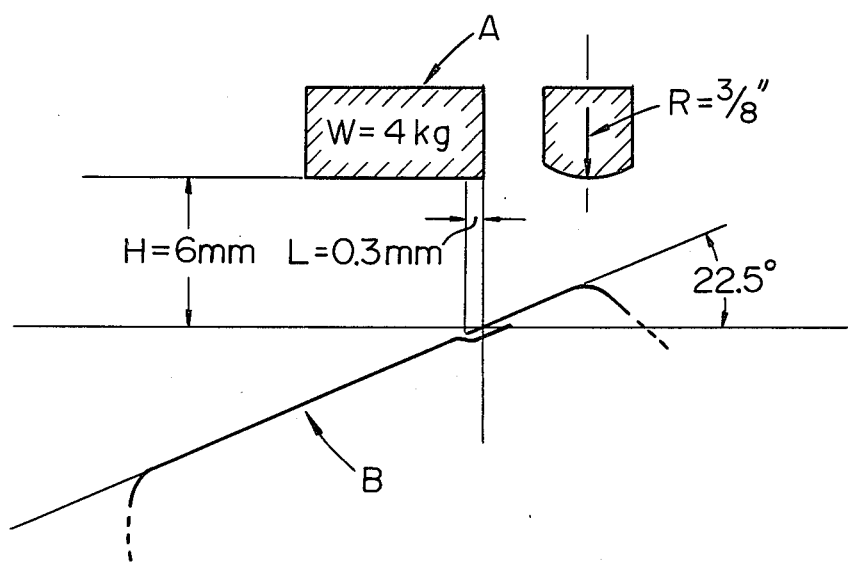
FIG. 5 is a view diagrammatically illustrating the denting test.

[C] Denting Test:

The metallic bottle sample was filled with a predetermined content, and as shown in FIG. 5, a 4-Kg weight A was let to vertically fall on the metallic bottle B inclined at an angle of 22.5° with respect to the horizontal direction from a certain height (6 mm) at a position 0.3 mm apart from the outer edge of the bonded portion.

The bottle in which the upper member was separated from the lower member or a clearance was formed in the bonded portion at this test was judged as the body breakage bottle. The bottle was then allowed to stand at 23° C. for 48 hours, and the pressure was measured. The bottle in which the inner pressure was lower by more than 5% than the inner pressure just after filling or bleeding of the content was observed in the vicinity of the bonded portion was judged as the leakage bottle. In the Tables, the ratio of the sum of the numbers of the barrel breakage bottles and the leakage bottles to the total number of the tested bottles is shown as "leakage percent (%)", and the parenthesized value indicates the body breakage percent (%) of the number of the body breakage bottles to the total number of the tested bottles.

Incidentally, the test was carried out at 0° C. or 25° C., and with respect to each sample, 50 bottles were tested after it was confirmed that the test temperature was maintained.

EXAMPLES 1 THROUGH 4 AND COMPARATIVE EXAMPLES 1 AND 2

A modified vinyl paint was coated on the inner and outer surfaces of an aluminum plate having a thickness of 0.23 mm (plate 3004, H19) so that the coated amounts were 150 mg/dm² and 60 mg/dm², respectively. The coated plate was baked and punched into a disc having a diameter of 94 mm, and the disc was formed into an upper member having a pouring mouth having a diameter of 25 mm at the center by a customary pressing operation. The inner diameter of the end edge of the portion to be bonded was 64.58 mm.

An aluminum plate having a thickness of 0.30 mm (plage 3004, H19) was punched into a disc having a diameter of about 142 mm, and the disc was formed into a cup having an inner diameter of about 85 mm between a drawing punch and a drawing die. The formed cup was subjected to re-drawing and was then ironed by an ironing punch and die having a diameter of about 66.1 mm. A modified vinyl paint was coated on the outer surface of the formed cup by a mandrel coater so that the amount coated was 60 mg/dm², and the coated paint was then baked. Then, the inner surface of the cup was spray-coated with the same paint so that the amount coated was 150 mg/dm², and the coated paint was baked. Then, the cup was subjected to the necking operation to form a lower member having an outer diameter of the circumferential edge of 64.43 mm (Example 1), 64.45 mm (Example 2), 64.50 mm (Example 3), 64.58 mm (Example 4), 64.62 mm (Comparative Example 1) or 64.36 mm (Comparative Example 2).

A polyamide A obtained by polycondensation of dimer acid, polyalkylene polyamine and hexamethylene diamine was coated in a thickness of 80 μm along a width of about 4 mm on the entire circumference of the outer surface side edge of the lower member by a hot melt applicator equipped with a gear pump.

The upper member was fitted with the adhesive-coated lower member, and the fitted portion was heated by high frequency induction heating to melt the adhesive, and the melt was cooled and solidified to obtain a metallic bottle comprising the upper and lower members bonded through the adhesive and having a capacity of about 500 ml. At the fitting step, the upper member was heated at about 150° C. in Example 4 or at about 250° C. in Comparative Example 1 to expand the end edge, and the fitting operation was then carried out. In Comparative Example 2, at the bonding step, air was blown from the pouring mouth to maintain an inner pressure of about 5 Kg/cm² and expand both the members, and then, the adhesive was melted and solidified by cooling.

The obtained metallic bottle was filled with a synthetic carbonated drink, and the pouring mouth was plugged. The metallic bottle was then subjected to the sterilization at 42° C. by a can warmer and then to the standing test at 50° C. Furthermore, the denting test was conducted at 0° C. and 25° C. to evaluate the strength of the bottle. The test results, the physical properties of the adhesive and the dimensions of the end portions of the upper and lower members are shown in Table 1.

EXAMPLES 5 AND 6 AND COMPARATIVE EXAMPLE 3

A modified vinyl paint was coated and baked on the inner and outer surfaces of an aluminum plate having a thickness of 0.23 mm (3004 plate, H19) so that the coated amounts were 180 mg/dm² and 80 mg/dm², respectively. The coated aluminum plate was punched into a disc having a diameter of 250 mm and the disc was formed into an upper member having a pouring mouth having a diameter of 30 mm at the center by a customary pressing operation. The inner diameter of the edge portion to be bonded was 110.6 mm.

A disc having a diameter of 250 mm was formed by punching the same coated plate as described above, and the disc was formed into a lower member in which the outer diameter of the end edge of the portion to be bonded was 110.6 mm.

An adhesive was coated on the entire circumference of the end edge of the lower member along a width of about 6 mm on the outer surface side and along a width of about 2 mm on the inner surface side according to the following procedures. In Example 5, a powder of a copolyester A comprising polytetramethylene terephthalate (PBT) and polytetramethylene isophthalate (PBI) at a PBT/PBI copolymerization ratio of 70/30 and having a particle size of 25 μm was electrostatically coated in the state where the lower member was masked so that the end edge portion was exposed along 6 mm on the outer surface side and along 2 mm on the inner surface side, and the powder was melted by an infrared ray heater to coat the adhesive in a thickness of about 85 μm. In Example 6, a nylon 11 film having a thickness of 80 μm and a width of 8 mm was applied to the entire circumference of the outer side end edge heated by high frequency induction heating in advance so that the film protruded along a width of about 2.5 mm. Then, while the end edge was heated by high frequency heating, the protruding portion of the adhesive film was folded back by a roll and applied to the inner surface side, whereby an adhesive-coated lower member was prepared. In Comparative Example 3, a nylon 610 film having a thickness of 80 μm and a width of 8 mm was applied to the lower member and folded back in the same manner as described in Example 6.

The upper member was fitted with the adhesive-coated lower member, and the fitted portion was subjected to high frequency induction heating to melt the adhesive and the melt was cooled and solidified to form a metallic bottle comprising the upper and lower members bonded together and having a capacity of about 2 l.

The shear strength of the bonded portion of the metallic bottle was measured just after bonding and also after the bottle had been allowed to stand still at 70° C. for 10 hours in the water-filled state. Beer was filled in the metallic bottle and the pouring mouth was plugged, and the filled bottle was sterilized at 65° C. for 30 minutes and allowed to stand still at 50° C. for 3 months. The leakage or body breakage was checked. The test results and the properties of the adhesives are shown in Table 2.

EXAMPLES 7 AND 8 AND COMPARATIVE EXAMPLES 4 AND 5

A modified vinyl paint was coated and baked on the inner and outer surfaces of an aluminum plate having a thickness of 0.23 mm (3004 plate, H19) so that the coated amounts were 150 mg/dm² and 60 mg/dm², respectively. The coated plate was punched into a disc having a diameter of 94 mm and the disc was formed into an upper member having a pouring mouth having a diameter of 25 mm at the center by a customary pressing operation. The inner diameter of the end edge of the portion to be bonded was 64.66 mm.

An aluminum plate having a thickness of 0.30 mm (3004 plate, H19) punched into a disc having a diameter of about 142 mm, and the disc was formed into a cup having an inner diameter of about 85 mm between a drawing punch and die. Then, the formed cup was subjected to the re-drawing operation and ironed by an ironing punch and die having a diameter of about 66.1 mm. A modified vinyl paint was coated on the outer surface of the cup by a mandrel coater so that the coated amount was 60 mg/dm², and the coated paint was baked. Then, the same paint was spray-coated on the inner surface so that the coated amount was 150 mg/dm², and the coated paint was baked. The coated cup was subjected to the necking operation to obtain a lower member in which the outer diameter of the circumferential edge was 64.60 mm.

An adhesive was coated on the entire circumference of the outer surface side edge of the lower member along a width of about 4 mm according to the following procedures. In Example 7, a 40 μm-thick film composed of a copolyester blend A comprising a copolyester comprising polyethylene terephthalate (PET) and polyethylene isophthalate (PEI) at a PET/PEI copolymerization ratio of 80/20, a copolyester comprising PBT and PBI at a PBT/PBI copolymerization ratio of 65/35 and an ethylene/vinyl acetate copolymer (EVA) having an ethylene/vinyl acetate copolymerization ratio of 90/10 (PET/PEI:PBT/PBI:EVA blending ratio=2:7:1) was applied to the outer surface side end edge of the lower member heated by high frequency induction heating. In Example 8, a resin powder having a particle size of 15μ and comprising a copolyester B comprising terephthalic acid and adipic acid at a molar ratio of 9/1 as the dibasic acid component and tetramethylene glycol as the glycol component and 15 PHR of titanium oxide (TiO₂) as the filler was electrostatically coated in a thickness of about 40 μm, and the resin was melted by a hot air oven to form a resin film. In Comparative Example 4, a polyamide B obtained by polycondensation of dimeric acid and polyalkylene polyamine was coated in the above-mentioned form in a thickness of about 40 μm by a hot melt applicator. In Comparative Example 5, a 40 μm-thick film of a copolyester blend C comprising polyethylene terephthalate (PET) and a copolyester comprising PET and PEI at a PET/PEI copolymerization ratio of 70/30 (PET:PET/PEI blending ratio=3:7) was applied to the outer surface side end edge of the lower member in the same manner as described in Example 7.

The upper member was fitted with the adhesive-coated lower member, and the fitted portion was subjected to high frequency induction heating to melt the adhesive, and the melt was cooled and solidified to obtain a metallic bottle comprising the upper and lower members bonded together and having a capacity of about 500 ml.

The metallic bottle was filled with cola and the pouring mouth was plugged, and the bottle was sterilized at 42° C. by a can warmer and subjected to the standing test at 50° C. Furthermore, the denting test was carried out at 0° C. and 25° C. to evaluate the strength of the bottle. The test results and the physical properties of the adhesives are shown in Table 3.

EXAMPLES 9 THROUGH 12 AND COMPARATIVE EXAMPLE 6

An epoxy-urea paint was coated on the inner and outer surfaces of a bright tin-deposited steel plate (T-1 plate, deposited amount=#50/#50) having a thickness of 0.23 mm so that the coated amounts were 150 mg/dm$^2$ and 60 mg/dm$^2$, respectively, and the coated paint was baked. The coated plate was punched into a disc having a diameter of 94 mm, and the disc was formed into an upper member having a pouring mouth having a diameter of 25 mm at the center by a customary pressing operation. The inner diameter of the end edge of the portion to be bonded was 64.56 mm.

A tin-deposited steel plate having a thickness of 0.30 mm was punched into a disc having a diameter of about 142 mm, and the disc was formed into a cup having an inner diameter of about 85 mm between a drawing punch and die. The cup was subjected to the re-drawing operation and was then ironed by an ironing punch and die having a diameter of about 66.1 mm. A modified epoxy paint was coated on the outer surface of the formed cup by a mandrel coater so that the coated amount was 60 mg/dm$^2$, and the coated paint was baked. An epoxy-urea paint was spray-coated on the inner surface of the cup so that the coated amount was 150 mg/dm$^2$, and the coated paint was baked. Then, the coated cup was subjected to the necking operation to form a lower member in which the outer diameter of the circumferential end edge was 64.50 mm.

An adhesive was coated on the entire circumference of the end edge of the lower member along a width of about 4 mm on the outer surface side and a width of about 2 mm on the inner surface side according to the following procedures. In Example 9, a film having a thickness of 50 μm and a width of 6 mm, which was composed of a copolyester D comprising terephthalic acid and isophthalic acid at a molar ratio of 8/2 as the dibasic acid component and tetramethylene glycol and triethylene glycol at a molar ratio of 20/1 as the glycol component was applied to the entire circumference of the outer surface side end edge of the lower member, which had been heated by high frequency induction heating, so that the film protruded along a width of about 2 mm. The protruding portion was folded back by a roll and applied to the inner surface side under high frequency induction heating, whereby an adhesive-coated lower member was formed. In Example 10, the lower member was masked so that the end edge of the lower member was exposed along a width of 4 mm on the outer surface side and along a width of 2 mm on the inner surface side, and a powder of maleic anhydride-modified polypropylene having a particle size of 35 μm was electrostatically coated and the powder was melted by an infrared ray heater to form a resin film having a thickness of about 50 μm. In Example 11, a part of the end edge of the lower member was dipped in a bath filled with a 30% solution of a vinyl chloride/vinyl acetate copolymer having a vinyl chloride/vinyl acetate molar ratio of 8.5/1.5 while the lower member was inclined at about 70° with respect to the vertical direction and was gently turned. Then, the solvent was vaporized and the resin was melted in a hot air oven to apply an adhesive film having a thickness of about 50 μm in the above-mentioned form. In Example 12, a film having a thickness of about 50 μm was formed on the end portion by using a powder of a copolymer nylon having a particle wize of 10 μm, which comprised lauryl lactam and caprolactam at a molar ratio of 9/1, in the same manner as described in Example 10. In Comparative Example 6, a film having a thickness of about 50 μm was formed on the end portion by using a random copolymer powder having a particle size of 20 μm and comprising acrylonitrile (A), butadiene (B) and styrene (S) at an A/B/S molar ratio of 4/2/4 in the same manner as described in Example 10.

The upper member was fitted with the adhesive-coated lower member, and the fitted portion was subjected to high frequency induction heating to melt the adhesive and the melt was cooled and solidified to form a metallic bottle comprising the upper and lower members bonded together and having a capacity of about 500 ml.

The metallic bottle was filled with cola and the pouring mouth was plugged, and the bottle was sterilized at 42° C. by a can warmer and subjected to the standing test at 50° C. Furthermore, the denting test was carried out at 0° C. and 25° C. to evaluate the strength of the bottle. The test results and the physical properties of the adhesives are shown in Table 4.

TABLE 1

| | | Dimensions (mm) of End Portions | | Leakage percent (Body Breakage | Leakage Percent(Body Breakage Percent) at Denting Test | |
|---|---|---|---|---|---|---|
| | Adhesive | $D_O$ (inner diameter of upper member) | $D_I$ (outer diameter of lower member) | percent) after Standing at 50° C. for 3 Months) | 0° C. | 25° C. |
| Example 1 | polyamide A, hot melt, softening point of 185° C. (ring-ball method), water content of 0.7% (23° C., 80% RH), elasticity contribution ratio $R(t)_{t=1}$ of $6.3 \times 10^{-4}$, group  concentration of 305 | 64.58 | 64.43 | 0% | 0% | 0% |

TABLE 1-continued

| | Adhesive | Dimensions (mm) of End Portions | | Leakage percent (Body Breakage percent) after Standing at 50° C. for 3 Months) | Leakage Percent(Body Breakage Percent) at Denting Test | |
|---|---|---|---|---|---|---|
| | | $D_O$ (inner diameter of upper member) | $D_I$ (outer diameter of lower member) | | 0% | 25° C. |
| Example 2 | polyamide A, hot melt, softening point of 185° C. (ring-ball method), water content of 0.7% (23° C., 80% RH), elasticity contribution ratio $R(t)_{t=1}$ of $6.3 \times 10^{-4}$, group $-\underset{\underset{O}{\|}}{C}-$ concentration of 305 meq/100 g | 64.58 | 64.45 | 0% | 0% | 0% |
| Example 3 | polyamide A, hot melt, softening point of 185° C. (ring-ball method), water content of 0.7% (23° C., 80% RH), elasticity contribution ratio $R(t)_{t=1}$ of $6.3 \times 10^{-4}$, group $-\underset{\underset{O}{\|}}{C}-$ concentration of 305 meq/100 g | 64.58 | 64.50 | 0% | 0% | 0% |
| Example 4 | polyamide A, hot melt, softening point of 185° C. (ring-ball method), water content of 0.7% (23° C., 80% RH), elasticity contribution ratio $R(t)_{t=1}$ of $6.3 \times 10^{-4}$, group $-\underset{\underset{O}{\|}}{C}-$ concentration of 305 meq/100 g | 64.58 | 64.58 | 0% (bonded portion slightly deformed) | 1%(o%) | 0% |
| Comparative Example 1 | polyamide A, hot melt, softening point of 185° C. (ring-ball method), water content of 0.7% (23° C., 80% RH), elasticity contribution ratio $R(t)_{t=1}$ of $6.3 \times 10^{-4}$, group $-\underset{\underset{O}{\|}}{C}-$ concentration of 305 meq/100 g | 64.58 | 64.62 | 2% (2%) (bonded portion deformed in many bottles) | 34%(18%) | 4%(2%) |
| Comparative Example 2 | polyamide A, hot melt, softening point of 185° C. (ring-ball method), water content of 0.7% (23° C., 80% RH), elasticity contribution ratio $R(t)_{t=1}$ of $6.3 \times 10^{-4}$, group $-\underset{\underset{O}{\|}}{C}-$ concentration of 305 meq/100 g | 64.58 | 64.36 | 94% (12%) | 86%(74%) | 62%(12%) |

TABLE 2

| | Adhesive | | | | | | Shear Strength (Kg/cm²) | | Leakage Percent (Body Breakage Percent) (50° C., 3 months) |
|---|---|---|---|---|---|---|---|---|---|
| | Kind | Form | Softening Point(°C.) (ring-ball method) | Water Content (%) (23° C., 80% RH) | Elasticity Contribution Ratio $R(t)_{t=1}$ | Group $-\underset{\underset{O}{\|}}{C}-$ concentration(meq/ 100 g) | Just After Bonding | After 10 Hours in Water at 70° C. | |
| Example 5 | copolyester A (PBt/PBI = 70/30) | powder | 180 | 0.5 | $5.0 \times 10^{-4}$ | 909 | >57 | >57 | 0% |
| Example 6 | nylon 11 | film | 188 | 0.6 | $3.6 \times 10^{-4}$ | 546 | >55 | >56 | 0% |
| Compara- | nylon 610 | film | 232 | 2.8 | $7.2 \times 10^{-3}$ | 739 | >56 | 42 | 46% (2%) |

TABLE 2-continued

| | | | Adhesive | | | | | | |
|---|---|---|---|---|---|---|---|---|---|
| | | | Softening Point(°C.) (ring-ball method) | Water Content (%) (23° C., 80% RH) | Elasticity Contribution Ratio $R(t)_{t=1}$ | Group $-\underset{\underset{O}{\|\|}}{C}-$ concentration (meq/100 g) | Shear Strength (Kg/cm$^2$) | | Leakage Percent (Body Breakage Percent) (50° C., 3 months) |
| | Kind | Form | | | | | Just After Bonding | After 10 Hours in Water at 70° C. | |
| tive Example 3 | | | | | | | | | |

TABLE 3

| | | | Adhesive | | | | | | |
|---|---|---|---|---|---|---|---|---|---|
| | | | Softening (ring-Ball method) | Water (%) (23° C., 80% RH) | Elasticity Contribution Ratio $R(t)_{t=1}$ | Group $-\underset{\underset{O}{\|\|}}{C}-$ concentration (meq/100 g) | Leakage Percent (Body Breakage) (50° C., 3 months) | Leakage Percent (Body Breakage Perting Test) | |
| | Kind | Form | | | | | | 0° C. | 25° C. |
| Example 7 | copolyester blend A (PET/PEI = 80/20, PBT/PBI = 65/35, EVA 90/10, 2:7:1) | film | 186 | 1.0 | $1.5 \times 10^{-1}$ | 856 | 0% | 0% | 0% |
| Example 8 | copolyester B + filler (terephthalic acid/isophthalic acid = 9/1, tetramethylene glycol, 15 PHR of TiO$_2$) | powder | 166 | 0.4 | $4.0 \times 10^{-4}$ | 780 | 0% | 0% | 0% |
| Comparative Example 4 | polyamide B (based on dimeric acid) | hot melt | 190 | 0.6 | $2.0 \times 10^{-5}$ | 286 | 58%(44%) | 8%(2%) | 4%(0%) |
| Comparative Example 5 | copolyester blend (PET, PET/PEI = 18/30, 3:7) | film | 202 | 0.4 | $9.0 \times 10^{-1}$ | 940 | 86%(2%) | 76%(8%) | 48%(2%) |

TABLE 4

| | | | Adhesive | | | | | | |
|---|---|---|---|---|---|---|---|---|---|
| | | | Softening Point(°C.) (ring-ball method) | Water Content (%) (23° C., 80% RH) | Elasticity Contribution Ratio $R(t)_{t=1}$ | Group $-\underset{\underset{O}{\|\|}}{C}-$ concentration (meq/100 g) | Leakage Percent (Body Breakage Percent) (50° C., 3 months) | Leakage Percent (Body Breakage Percent) at Denting Test | |
| | Kind | Form | | | | | | 0° C. | 25° C. |
| Example 9 | copolyester D (terephthalic acid/isophthalic acid = 8.5/1.5, tetramethylene glycol/triethylene glycol = 20/1) | film | 186 | 0.6 | $5.3 \times 10^{-2}$ | 890 | 0% | 0% | 0% |
| Example 10 | maleic anhydride-modified polypropylene | powder | 165 | 0.06 | $1.2 \times 10^{-3}$ | 13 | 0% | 0% | 0% |
| Example 11 | vinyl chloride/vinyl acetate copolymer (vinyl chloride/vinyl acetate = 8.5/1.5) | solution | 105 | 0.07 | $8.3 \times 10^{-4}$ | 174 | 0% | 0% | 0% |
| Example 12 | nylon copolymer (nylon 12/nylon 6 = 9/1) | powder | 170 | 1.1 | $4.9 \times 10^{-2}$ | 546 | 0% | 0% | 0% |
| Comparative Example 6 | ABS (4/2/4) | powder | 135 | 0.8 | $6.3 \times 10^{-4}$ | 3> | 36%(32%) | 74%(60%) | 36%(14%) |

What is claimed is:

1. A process for the preparation of metallic bottles which comprises lap-bonding circumferential open end portions of upper and lower members, each consisting of a formed cup of a metal having a circumferential open end, applying an adhesive to at least one of the outer and inner faces of the open ends to be lap-bonded, fitting the two circumferential open ends to each other through the adhesive layer, melting the adhesive layer present in the lap portion, and cooling the adhesive layer to form a circumferential seam for a metallic bottle, said adhesive comprising at least one thermoplastic resin adhesive having a water absorption of less than 2%, as measured at a temperature of 23° C. and a relative humidity of 80%, and an elasticity contribution ratio $(R(t)_{t=1})$ of from $1 \times 10^{-4}$ to $5 \times 10^{-1}$, defined by the following formula $$R(t)_{t=1} = J(t)_{rec, t=1} / J(t)_{t=1}$$

wherein $J(t)_{t=1}$ represents a creep compliance at a time constant of 1 second when the adhesive is caused to creep at a temperature higher by 30° C. Than the melting point of the adhesive under a shear stress of 50 to 5,000 dyne/cm², and $J(t)_{rec, t=1}$ represents an equilibrium recovery creep compliance when the adhesive is caused to creep under the same conditions as described above and the adhesive is then let to recover, and containing in the main or side chain groups

at a concentration 10 to 1400 milliequivalents per 100 g of the adhesive.

2. A process for the preparation of metallic bottles which comprises preparing upper and lower members, each consisting of a formed cup of a metal having a circumferential open end, applying an adhesive to at least one of the outer and inner faces of the open ends to be lap bonded, fitting the two circumferential ends to each other through the adhesive layer, melting the adhesive layer present in the lap portion, and cooling the adhesive layer to form a circumferential seam for a metallic bottle, said adhesive comprising at least one thermoplastic resin adhesive having a water absorption of less than 2%, as measured at a temperature of 23° C. and a relative humidity of 80%, and an eleasticity contribution ratio $(R(t)_{t=1})$ of from $1 \times 10^{-4}$ to $5 \times 10^{-1}$, defined by the following formula $$R(t)_{t=1} = J(t)_{rec, t=1} / J(t)_{t=1}$$

wherein $J(t)_{t=1}$ represents a creep compliance at a time constant of 1 second when the adhesive is caused to creep at a temperature higher by 30° C. than the melting point of the adhesive under a shear stress of 50 to 5,000 dyne/cm², and $J(t)_{rec, t=1}$ represents an equilibrium recovery creep compliance when the adhesive is caused to creep under the same conditions as described above and the adhesive is then let to recover, and containing in the main or side chain groups

at a concentration of 10 to 1400 milliequivalents per 100 g of the adhesive, wherein the upper member, the lower member and the adhesive layer have a dimensional relationship satisfying the requirements of $D_O \geq D_I$ and $D_I + 2d_A > D_O$, wherein $D_I$ stands for the outer diameter of the open end portion to be formed into an inner side of the lap-bonded portion, $D_O$ stands for the inner diameter of the open end portion to be formed into an outer side of the lap-bonded portion, and $d_A$ stands for the thickness of the adhesive before the lap-bonding.

3. A process according to claim 1, wherein the resin constituting the adhesive has a number average molecular weight of at least 6,000 on the average.

4. A process according to claim 1, wherein the thermoplastic resin has a softening point of 80° to 280° C.

5. A process according to claim 1, wherein the thermoplastic resin is at least one copolyester.

6. A process according to claim 5, wherein the copolyester is a copolyester containing terephthalic acid units and other dibasic acid units as the dibasic acid component and tetramethylene glycol units as the diol component.

7. A process according to claim 5, wherein the copolyester is a copolyester containing benzene-dicarboxylic acid units as the dibasic acid component and tetramethylene glycol units and other diol units as the diol component.

8. A process according to claim 1, wherein the thermoplastic resin is at least one nylon containing 4 to 12 amide groups per 100 carbon atoms.

9. A process according to claim 2, wherein the resin constituting the adhesive has a number average molecular weight of at least 6,000 on the average.

10. A process according to claim 2, wherein the thermoplastic resin has a softening point of 80° to 280° C.

11. A process according to claim 2, wherein the thermoplastic resin is at least one copolyester.

12. A process according to claim 2, wherein the copolyester is a copolyester containing terephthalic acid units and other dibasic acid units as the dibasic acid component and tetramethylene glycol units as the diol component.

13. A process according to claim 2, wherein the copolyester is a copolyester containing benzene-dicarboxylic acid units as the dibasic acid component and tetramethylene glycol units and other diol units as the diol component.

14. A process according to claim 2, wherein the thermoplastic resin is at least one nylon containing 4 to 12 amide groups per 100 carbon atoms.

* * * * *